United States Patent [19]
Fishman et al.

[11] Patent Number: 5,329,396
[45] Date of Patent: Jul. 12, 1994

[54] REDUCTION OF STIMULATED BRILLOUIN SCATTERING IN A FIBER OPTIC TRANSMISSION SYSTEM

[75] Inventors: Daniel A. Fishman, Lakewood; Jonathan A. Nagel, Freehold, both of N.J.; Yong-Kwan Park, Wescosville, Pa.

[73] Assignee: AT&T Bell Laboratories, Murray Hill, N.J.

[21] Appl. No.: 967,649

[22] Filed: Oct. 28, 1992

[51] Int. Cl.$^5$ .............................................. H04B 10/12
[52] U.S. Cl. .................................. 359/173; 359/160; 359/161; 359/188
[58] Field of Search ............... 359/134, 124, 160, 161, 359/173, 188, 195

[56] References Cited

U.S. PATENT DOCUMENTS

| | | | |
|---|---|---|---|
| 4,699,452 | 10/1987 | Mollenauer | 359/173 |
| 4,769,820 | 9/1988 | Holmes | 372/33 |
| 4,817,207 | 3/1989 | Smith et al. | 455/617 |
| 4,918,751 | 4/1990 | Pessot et al. | 455/608 |

OTHER PUBLICATIONS

"Input Power Limits of Single-Mode Optical Fibers due to Stimulated Brillouin Scattering in Optical Communication Systems" Aoki, et al., J. of Lightwave Tech., vol. 6, No. 5 May 1988 pp. 710–719.

*Primary Examiner*—Leslie Pascal
*Attorney, Agent, or Firm*—Robert P. Marley

[57] ABSTRACT

A technique for reducing the power threshold at which stimulated brillouin scattering ("SBS") occurs within an optical fiber by directly modulating a conventional laser generating an optical signal propagated along that fiber. The modulation is accomplished by employing an alternating waveform to induce a dither upon the laser output. The specific frequency of the alternating waveform is chosen to be very much lower than the low frequency cut-off of any receiver coupled to the optical fiber, but sufficiently high enough to efficiently suppress the Brillouin gain. This dithering causes the laser to be frequency modulated, thereby broadening the effective linewidth of the laser output and increasing the SBS power threshold.

5 Claims, 8 Drawing Sheets

FIG. 5

$P_{PUMP} = +15.4$ dBm $L_{eff} = 40$ km

| DITHER FREQUENCY | $P_{SBS}$ | EFFECTIVE LINEWIDTH |
|---|---|---|
| 1.0 kHz | −37 dBm | 900 MHz |
| 2.0 kHz | −42 dBm | 800 MHz |
| 3.0 kHz | −45 dBm | 750 MHz |
| 5.0 kHz | −55 dBm | 600 MHz |
| 6.0 kHz | −55 dBm | 500 MHz |
| 7.0 kHz | −62 dBm | 500 MHz |
| 9.0 kHz | −62 dBm | 450 MHz |
| 10.0 kHz | −62 dBm | 400 MHz |
| 20.0 kHz | −55 dBm | 300 MHz |
| 30.0 kHz | −47 dBm | 250 MHz |
| 40.0 kHz | −42 dBm | 250 MHz |
| 50.0 kHz | −42 dBm | 200 MHz |
| 100.0 kHz | −42 dBm | 200 MHz |

REDUCTION OF STIMULATED BRILLOUIN SCATTERING IN A FIBER OPTIC TRANSMISSION SYSTEM

TECHNICAL FIELD

The invention relates to the optical transmission of information and, more particularly, to improving transmission capabilities along a low-loss optical fiber transmission path.

BACKGROUND OF THE INVENTION

The combination of high powered, narrow linewidth laser optical sources and low-loss single-mode optical fiber, opens the possibility of signal degradation and increased bit error rates caused by a host of nonlinear fiber-related phenomena hitherto considered inconsequential with respect to conventional fiber-optic systems. These non-linear phenomena include stimulated Brillouin scattering ("SBS"), stimulated Raman scattering, self-phase modulation, and, if two or more optical channels are involved, cross-phase modulation and four-photon mixing.

Brillouin scattering within a fiber results from photons being scattered by localized refractive index variations induced by sound or acoustic waves. These refractive index variations are caused by sonic vibrations in the glass lattice that makes up the fiber core. Furthermore, owing to the dependence of refractive index on light intensity in the nonlinear regime, the presence of intense light in the fiber will also induce lattice vibrations which in-turn induce sound waves, that then scatter more light. Ultimately, light from an intense forward propagating signal (referred to as a "pump signal") can provide gain for a backward propagating or "Stokes" signal. This scenario is a classical description of SBS. SBS threshold power ("$P_{SBS}$") is arbitrarily defined as the level of input optical pump signal power ("$P_{pump}$") at which the power of the backward Stokes signal ("$P_{Stokes}$") becomes equal to $P_{pump}$ at the fiber input. SBS threshold power increases with the linewidth of the light being propagated along a fiber. For this reason, concern over the adverse effects of SBS was minimal until the debut of narrow linewidth laser sources. Now, however, as narrow linewidth lasers become more readily available, and as such lasers are likely to be the optical source of choice for future fiber transmission systems, SBS has the potential for significantly contributing to signal degradation at relatively low input power levels.

Some previous SBS suppression techniques required the use of exotic lasers, and/or employing particular types of specially fabricated fibers as the transmission media. This is obviously not a practical solution for use with existing optical fiber systems and commercially available laser technology. Other methods of increasing the power threshold at which SBS occurs involve employing lasers having increased linewidths to generate the signals propagated via the optical fiber systems. However, these methods have proved undesirable as an increased linewidth typically results in degrading the dispersion characteristics of the propagating optical signal.

SUMMARY OF THE INVENTION

The present invention overcomes the deficiencies of prior SBS reduction techniques by directly modulating a conventional semiconductor laser generating an optical signal to be propagated along an optical fiber. The modulation is accomplished by employing an alternating waveform to induce a dither upon the laser output. The specific frequency of the alternating waveform is chosen to be very much lower than the low frequency cut-off of any receiver coupled to the optical fiber, but sufficiently high enough to efficiently suppress the Brillouin gain. This dithering causes the laser to be frequency modulated, thereby broadening the effective linewidth of the laser output and increasing the SBS power threshold.

BRIEF DESCRIPTION OF THE DRAWING

In the drawing:

FIG. 5 shows a table of measured SBS power as a function of laser bias dither frequency.

DETAILED DESCRIPTION OF THE INVENTION

As is known in the art (see, for example, Y. Aoki, K. Tajima, I. Mito, "Input Power Limits of Single-Mode Optical Fibers due to Stimulated Brillouin Scattering in Optical Communication Systems," J. Lightwave Technol., vol. 6, no. 5, p. 710 (May 1988)), the SBS threshold power for continuous wave ("CW") pump light ($P^{CW}_{SBS}$) can be expressed in terms of the effective transmission fiber core area $A_{eff}$, the effective transmission fiber length $L_{eff}$, and the gain coefficient for the SBS process $g_o$. For long fiber optic spans transmitting a CW signal originating from a pump laser having a finite linewidth $\Delta v_p$, and a spontaneous Brillouin linewidth of $\Delta v_B$, the SBS power threshold is given by $$P^{CW}_{SBS} \approx 42 \frac{A_{eff}}{g_o L_{eff}} \left[ \frac{\Delta v_B + \Delta v_P}{\Delta v_B} \right].$$

In the above equation, it is assumed that the pump signal is randomly polarized, and that $L_{eff}$ can be approximated as $(1 - e^{-\alpha L})/\alpha \approx 1/\alpha$; where $\alpha$ is the fiber attenuation constant, and L is the actual fiber length. In a typical single-mode fiber where $A_{eff} \approx 80 \ \mu m^2$, $\alpha = 0.22$ dB/km, $L_{eff} \approx 10 \ log_{10} e/\alpha = 19.74$ km, and $g_o = 4 \times 10^{-9}$ cm/W, the SBS threshold power is about 4.25 mW (assuming $\Delta \nu_B/\Delta \nu_p < 1$). Clearly, as the finite linewidth $\Delta \nu_p$ increases, so does SBS threshold power.

A similar relationship between linewidth and SBS threshold power exists for modulated optical signals, such as the digitally encoded signals typically transmitted within optical telecommunication networks. For such signals the SBS gain in long optical fibers is given by a convolution between the pump spectrum and the spontaneous Brillouin linewidth. Hence, knowing the pump frequency spectrum, and assuming a Lorentzian Brillouin linewidth ($\Delta \nu_B$), the gain and SBS threshold power for a modulated optical signal can be determined. In digital telecommunication systems the optical pump signal is typically amplitude-shift-key ("ASK") modulated with a one-half mark density pseudorandom signal. For the special case of a non-return-to-zero data format, where the average pump power is equal to the CW power, the SBS threshold power is given by $$P_{SBS}^{ASK} = \frac{P_{SBS}^{CW}}{1 - \frac{f_0}{2\Delta \nu_B}(1 - e^{-\Delta \nu_B/f_0})};$$

where $f_o$ is the bit repetition rate. For high bit-rate systems where $\Delta \nu_B/f_o \approx 0$, the above equation predicts a two fold increase in the SBS threshold power level. Intuitively, such a result would be expected as the relatively spectrally pure pump carrier contains one-half the total CW pump energy. As with the CW case, an increase in the spontaneous Brillouin linewidth $\Delta \nu_p$ results in an increase in the SBS threshold power.

Figure 1:
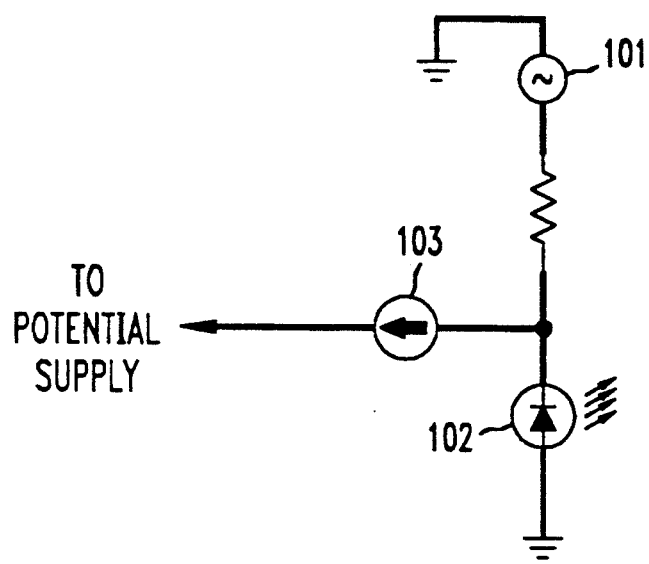
FIG. 1 is a schematic diagram of an exemplary circuit wherein an alternating waveform, produced by a signal generator, is employed to modulate the bias current supplied to a pump laser by a current generator.

By dithering the bias current of a pump laser, the optical output of that laser can be frequency modulated independent of, and in addition to any other modulation (such as digital or analog information encoding). This frequency modulation serves to increase the effective linewidth of the laser. While the finite linewidth $\Delta \nu_p$, which is a function of the fixed physical characteristics of the laser, actually remains constant, the dithering of the laser bias current causes the wavelength of the laser's output signal to be cyclicly shifted in about the natural output wavelength produced by the un-dithered laser. This effectively spreads the output linewidth over a range centered about the un-dithered $\Delta \nu_p$, and since the dither frequency is outside the receiver bandwidth, the optical signal is not degraded in the presence of dispersion. The dithering of laser bias current may be accomplished by employing an alternating waveform to induce a dither upon the laser output. FIG. 1 shows a schematic diagram of an exemplary circuit wherein an alternating waveform of frequency f, produced by signal generator 101, is employed to modulate the bias current supplied to pump laser 102 by current generator 103.

Figure 2A:
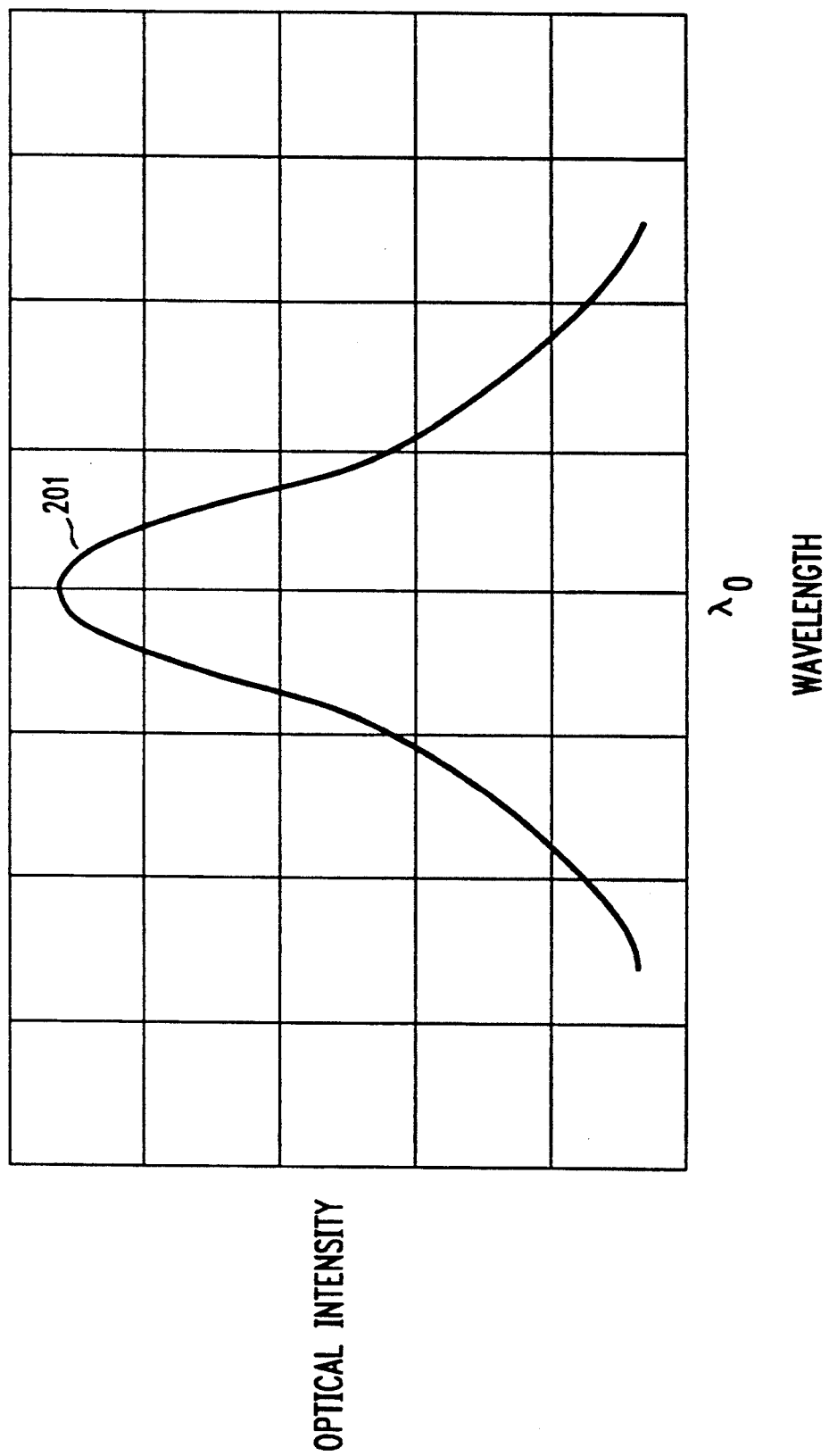
FIG. 2A provides a graphical illustration of the optical spectrum of a typical laser, biased at a fixed current $I_o$.
Figure 2B:
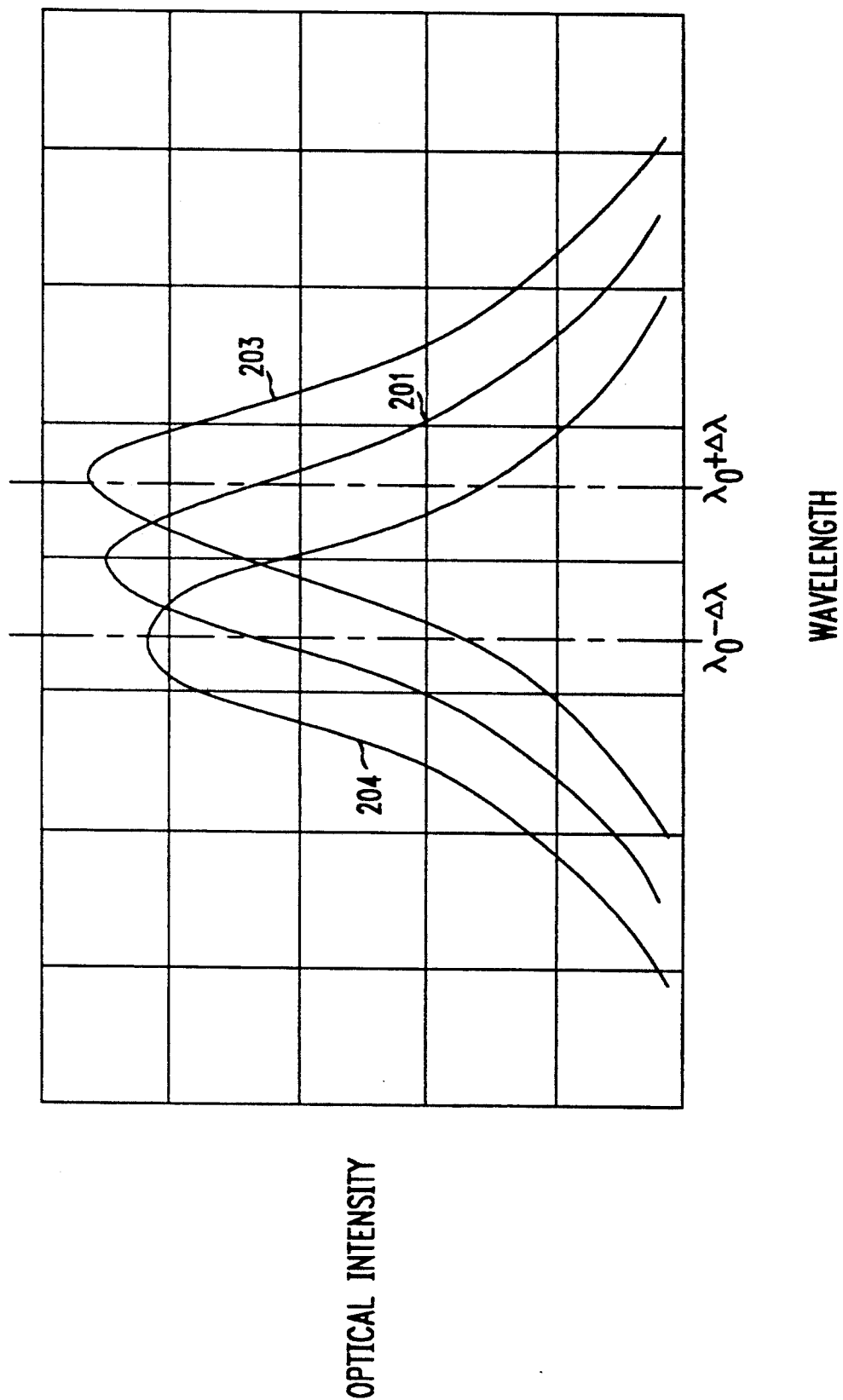
FIG. 2B provides a graphical illustration of the optical spectrum for the laser of FIG. 2A, biased at a fixed currents $I_o - \Delta I$ and $I_o + \Delta I$.
Figure 2C:
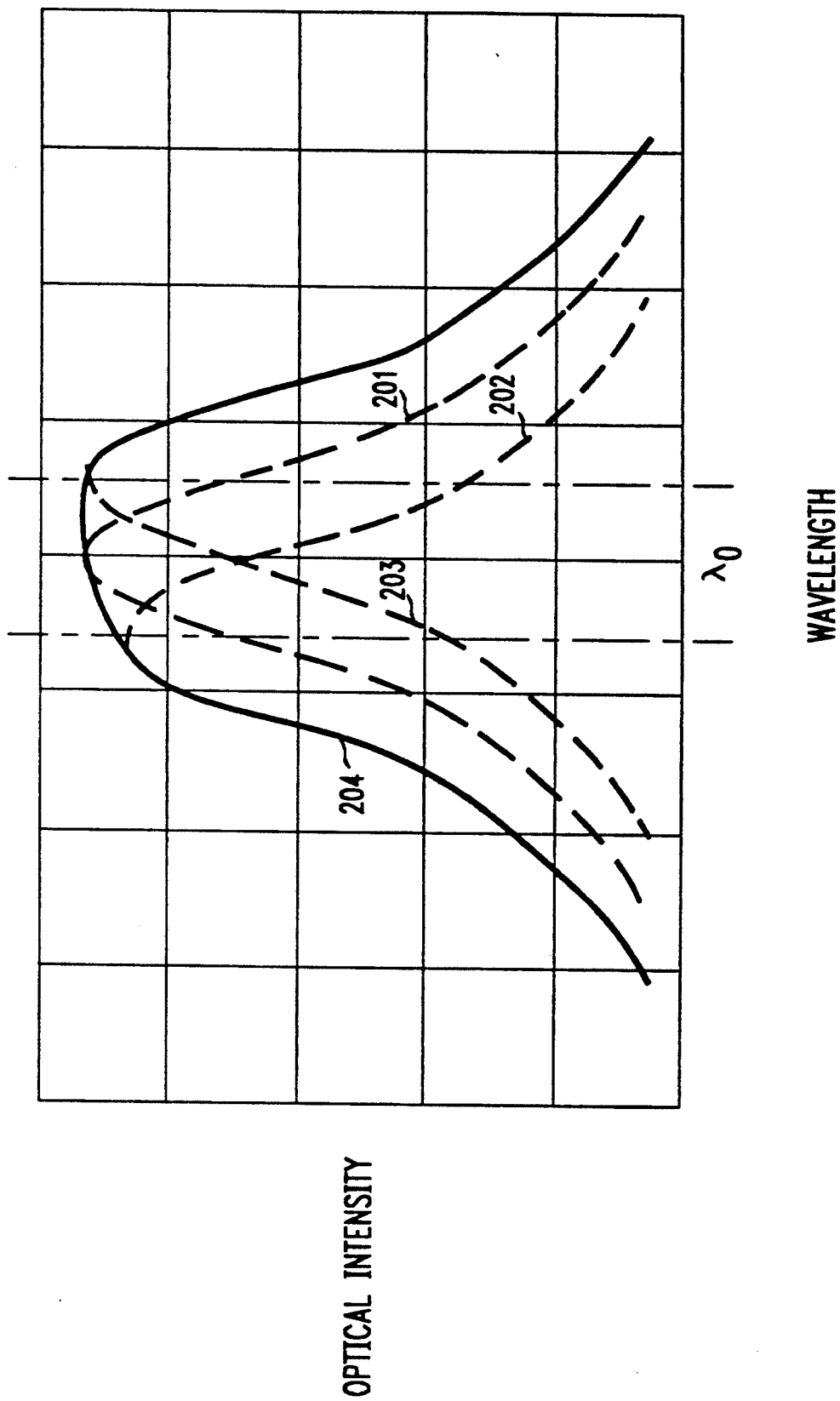
FIG. 2C provides a graphical illustration of the optical spectrum for the laser of FIG. 2A as the bias current is dithered so that it cyclicly varies between $I_o + \Delta I$ and $I_o - \Delta I$.

FIGS. 2A-2C provide a graphical illustration of the effective linewidth widening accomplished by dithering laser bias current. A representative plot of the optical spectrum (intensity versus wavelength) for a typical distributed feedback ("DFB") laser, biased at some fixed current $I_o$, is shown in FIG. 2A. The laser produces an optical output signal having a fixed linewidth, as represented by the particular contour of curve 201, which is centered about wavelength $\lambda_o$. FIG. 2B shows the optical spectrum plot for the laser of FIG. 2A biased at current levels $I_o - \Delta I$ (curve 202) and $I_o + \Delta I$ (curve 203). As illustrated, the output signal wavelength is shifted by $\pm \Delta \lambda$ in response to change in bias current. If the bias current is dithered so that it cyclicly varies between $I_o \pm \Delta I$, the optical output of the laser, when viewed over time, appears to have a widened linewidth centered about $\lambda$ (as represented by curve 204 of FIG. 2C).

Figure 3:
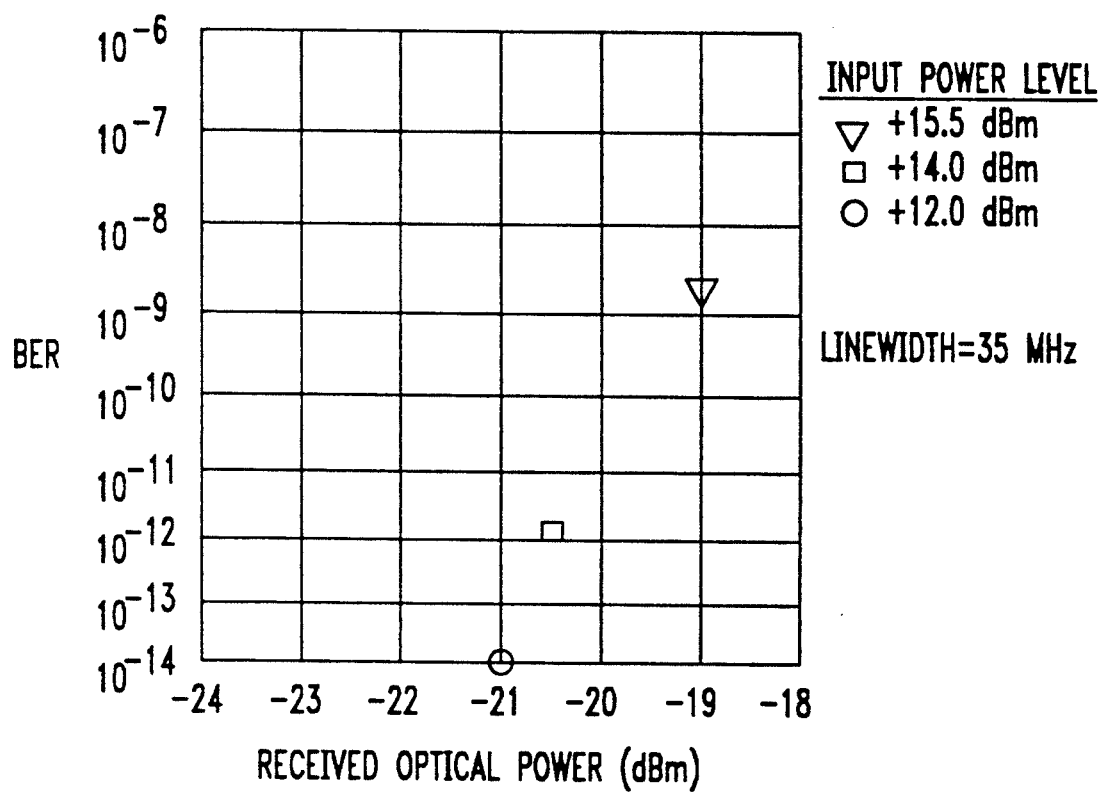
FIG. 3 provides a graphical illustration of the bit error rate for optical signals of various power levels having a 35 MHz linewidth after transmission through a 60 km length of optical fiber.
Figure 4:
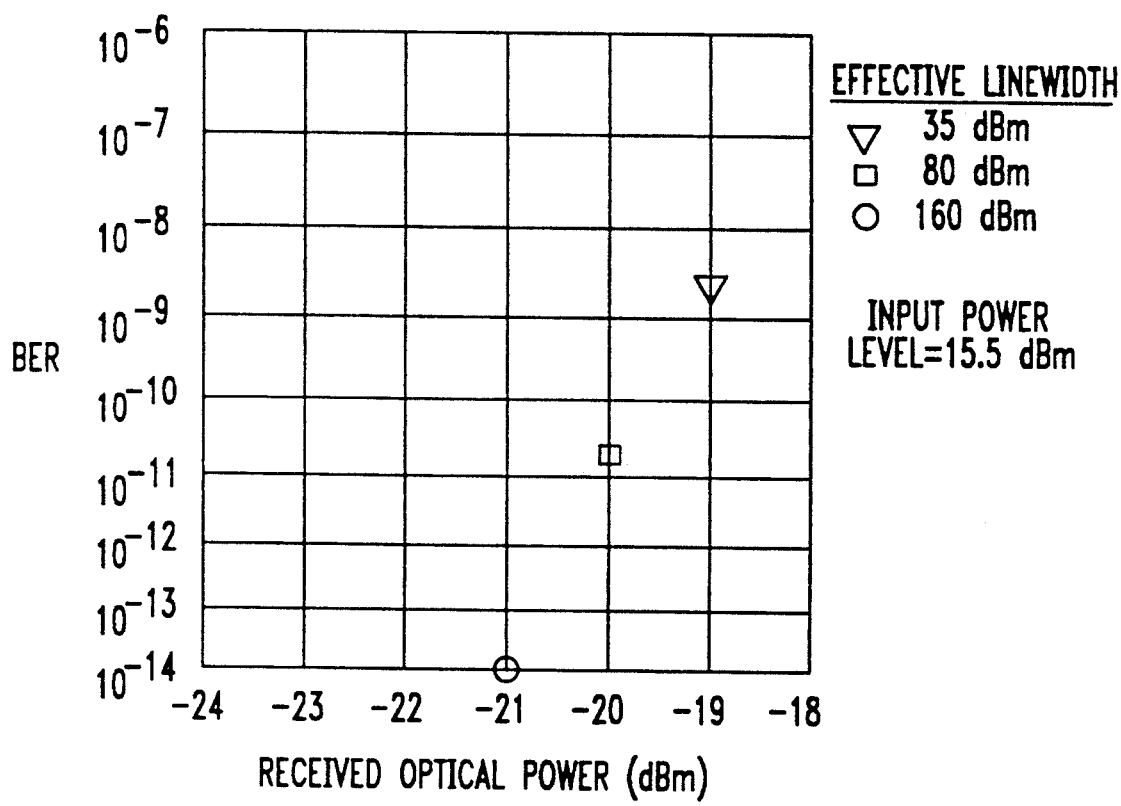
FIG. 4 provides a graphical illustration of the bit error rate for a +15.5 dBm optical signals of varied linewidths after transmission through a 60 km length of optical fiber.

FIG. 3 provides a graphical representation of experimental results showing the measured bit error rate ("BER") for a 5 Gb/s digitally encoded, 1558 nm optical signal traveling through a 60 km length of optical fiber. The natural linewidth, $\Delta \nu_p$, produced by the DFB laser generating the signal in a steady state (undithered) bias condition is 35 MHz. As is shown, for an input power of $+15.5$ dBm a BER of between $1 \times 10^{-8}$ and $1 \times 10^{-9}$ results from the signal passing through the optical fiber, and reducing the input power level to $+14$ dBm lowers BER to between $1 \times 10^{-11}$ and $1 \times 10^{-12}$. With input power reduced to $+12$ dBm, a level below the SBS power threshold of the 60 km optical fiber, BER drops to $1 \times 10^{-14}$. In order to suppress SBS effects at high power levels, the DFB laser linewidth is broadened by directly modulating the laser bias current with a small, low frequency square wave signal. FIG. 4 shows BER performance for an $+15.5$ dBm 1558 nm optical signal produced by an undithered laser (effective linewidth 35 MHz), and for $+15.5$ dBm signals having effective linewidths of 80 MHz and 160 MHz produced as a result of laser bias dithering. As shown, at an effective line width of 160 MHz the BER is reduced to $1 \times 10^{-14}$. This value is commensurate with that achieved using an undithered signal at power level below the SBS threshold of the optical fiber.

To ensure complete SBS suppression through the entire effective length of an optical fiber the dither frequency should not be below $c/2 \ nL_{eff}$ (where n is the fiber index of refraction). For an optical fiber having an effective length of 17 km and a refractive index of 1.45, this minimum dither frequency is approximately 6 kHz. The minimum dither frequency ensures that the absolute optical frequency of the Brillouin gain is shifted in a time equal to the transit time of the optical fiber, thereby preventing any significant length of optical fiber from being subjected to a narrow linewidth signal of a particular wavelength for any appreciable amount of time. This effectively shortens the interaction length for the optical signal within the fiber, thereby inhibiting SBS over the length of the fiber. The maximum dither frequency limit is naturally bounded by minimum frequency detectable by any optical receiver connected to the optical fiber so that signal performance is not impaired (typically this frequency is 100 kHz to 200 kHz for receivers within intensity modulated optical systems).

In addition, lasers typically exhibit a loss of $\Delta \nu/\Delta I$ sensitivity at very high frequency dither rates. As a result, it is often necessary to limit dithering to a frequency substantially lower than the cut-off frequency of any optical receivers in order to guarantee the proper optical response by the dithered laser. FIG. 5 shows a chart of experimental measurements confirming the dither frequency limitations. As shown, the measured SBS power ("$P_{SBS}$") arising from a $+15.4$ dBm optical signal from a DFB pump laser as it is transmitted through a single-mode optical fiber having an effective length of 40 km is minimized when the pump laser bias is dithered at frequency between 7 and 10 kHz.

Figure 6:
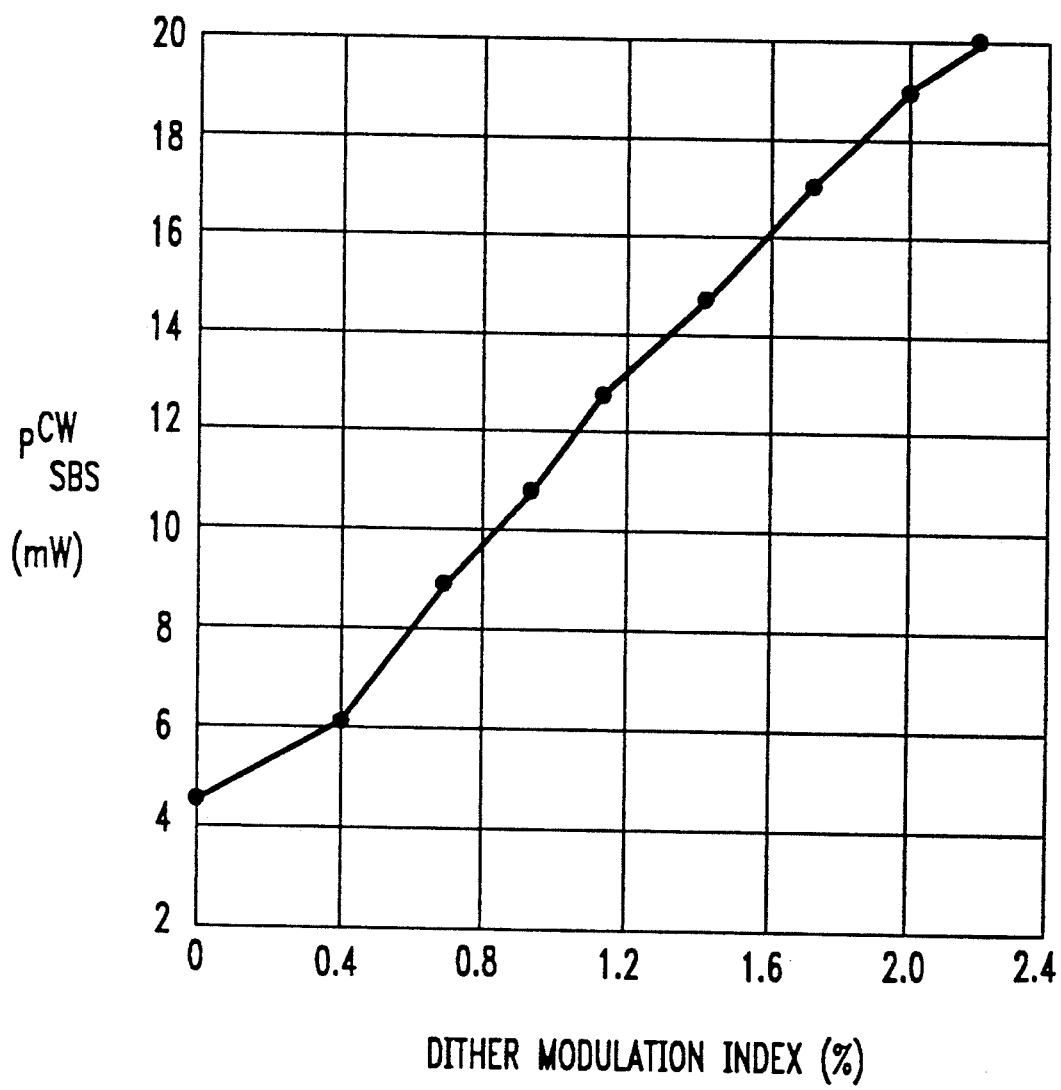
FIG. 6 shows a graphical illustration of the measured continuous wave SBS threshold power for a semiconductor laser over a range of current modulation amplitudes at a frequency of 7 kHz.

The magnitude of the dither required to effectively suppress SBS, depends upon the $\Delta\nu/\Delta I$ frequency modulation response of an individual pump laser (i.e., the change in the effective linewidth of output light as a function of the change in the laser bias current). For a typical semiconductor laser, frequency modulation response is usually between 200 MHz/mA and 1 GHz/mA. FIG. 6 shows the measured CW SBS threshold power for a DFB semiconductor laser over a range of current modulation amplitudes at a frequency of 7 kHz. The DFB laser was initially biased at 100 mA and produced a 25 MHz linewidth. Dither modulation index is defined as $\Delta I_{dither}/I_{initial}$.

Typically, optical signals having a wide linewidths are subject to dispersion effects when transmitted over long lengths of optical fiber. This is because wide natural linewidths ($\Delta\nu_p$) result from phase noise in a laser, and phase noise contributes to dispersion penalties caused by phase to amplitude modulation conversion over long optical fibers. However, the dithering which causes the wide effective linewidths in the invention does not increase phase noise, thereby enabling the dithered optical signals to be transmitted over long fiber lengths without degrading as a result of increased dispersion penalties.

It will be understood that the particular embodiments described above are only illustrative of the principles of the present invention, and that various modifications could be made by those skilled in the art without departing from the scope and spirit of the present invention, which is limited only by the claims that follow.

We claim:

1. A method for suppressing stimulated Brillouin scattering in an optical transmission system in which an information encoded optical signal originates from an optical source and is transmitted via an optical fiber to at least one optical receiver having a fixed bandwith of sensitivity, wherein:

said information encoded optical signal is frequency modulated, supplemental to and independent of any other modulation performed upon said optical signal for purposes of encoding information, so as to effectively increase the linewidth of said information encoded optical signal prior to transmission via said optical fiber, the frequency of said supplemental modulation being outside said fixed bandwidth of optical receiver sensitivity.

2. The method of claim 1 wherein said supplemental frequency modulation of said information encoded optical signal is performed at a frequency f, where f is greater than or equal to $c/2\, nL_{eff}$, c being the speed of light, n being the index of refraction of the optical fiber, and $L_{eff}$ being the effective length of the optical fiber; and where f is less than the minimum frequency included within said fixed bandwidth of optical receiver sensitivity.

3. A method for suppressing stimulated Brillouin scattering within an optical transmission system in which an information encoded optical signal originates from an optical source responsive to an applied bias current, and is transmitted via an optical fiber to at least one optical receiver having a fixed sensitivity bandwidth, wherein:

said applied bias current is dithered to frequency modulate said information encoded optical signal, supplemental to and independent of any other modulation performed upon said optical signal for purposes of encoding information, so as to effectively increase the linewidth of said information encoded optical signal prior to transmission via said optical fiber, the frequency of said supplemental modulation being outside said bandwidth of optical receiver sensitivity.

4. The method of claim 3 wherein said frequency modulation of said information encoded optical signal prior to transmission via said optical fiber is performed at a frequency f, where f is greater than or equal to $c/2\, nL_{eff}$, c being the speed of light, n being the index of refraction of the optical fiber, and $L_{eff}$ being the effective length of the optical fiber; and where f is less than the minimum frequency within said fixed bandwidth of optical receiver sensitivity.

5. The method of claim 3 wherein said optical source is a semiconductor laser.

* * * * *